United States Patent
Liu et al.

(10) Patent No.: US 9,628,525 B2
(45) Date of Patent: Apr. 18, 2017

(54) DETERMINING USER PERCEIVED DELAYS IN VOICE CONFERENCING SYSTEMS AND VIDEO CONFERENCING SYSTEMS

(71) Applicants: Yong Liu, Brooklyn, NY (US); Yang Xu, Brooklyn, NY (US); Chenguang Yu, Brooklyn, NY (US)

(72) Inventors: Yong Liu, Brooklyn, NY (US); Yang Xu, Brooklyn, NY (US); Chenguang Yu, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 268 days.

(21) Appl. No.: 14/520,323

(22) Filed: Oct. 21, 2014

(65) Prior Publication Data
US 2015/0113063 A1  Apr. 23, 2015

Related U.S. Application Data

(60) Provisional application No. 61/893,987, filed on Oct. 22, 2013.

(51) Int. Cl.
| | |
|---|---|
| *H04L 29/06* | (2006.01) |
| *H04M 3/56* | (2006.01) |
| *H04N 7/14* | (2006.01) |
| *H04N 7/15* | (2006.01) |
| *H04M 3/22* | (2006.01) |

(52) U.S. Cl.
CPC ......... *H04L 65/403* (2013.01); *H04M 3/568* (2013.01); *H04N 7/147* (2013.01); *H04N 7/152* (2013.01); *H04M 3/2236* (2013.01)

(58) Field of Classification Search
CPC ..................................... H04L 65/403
See application file for complete search history.

(56) References Cited

U.S. PATENT DOCUMENTS

| | | | | |
|---|---|---|---|---|
| 6,594,344 | B2* | 7/2003 | Masri ................. | H04L 43/0852 379/10.02 |
| 6,775,240 | B1* | 8/2004 | Zhang ................ | H04L 43/0829 370/248 |
| 7,590,222 | B1* | 9/2009 | Smith .................... | H04M 1/24 370/248 |
| 2013/0251329 | A1* | 9/2013 | McCoy ................ | H04N 21/654 386/201 |
| 2014/0085459 | A1* | 3/2014 | Blanton ................ | H04N 17/04 348/135 |
| 2014/0165085 | A1* | 6/2014 | Karacali-Akyamac ........ | H04N 21/23418 725/14 |

* cited by examiner

*Primary Examiner* — Shirley Zhang
(74) *Attorney, Agent, or Firm* — John C. Pokotylo; Straub & Pokotylo

(57) ABSTRACT

The determination of user perceived delay in audio and video conferencing systems/services is described. Example embodiments consistent with the present invention measure delays in audio and/or video conferencing systems and services, by treating such systems and services as black boxes, thereby providing end-to-end delays as they would be perceived by users. For example, the user perceived round-trip delay in a video conference system/service may include time delays from each of video capture, video encoding, video transmission, video decoding and video rendering.

17 Claims, 14 Drawing Sheets

DETERMINING USER PERCEIVED DELAYS IN VOICE CONFERENCING SYSTEMS AND VIDEO CONFERENCING SYSTEMS

§0. RELATED APPLICATIONS

This application claims benefit to U.S. Provisional Application Ser. No. 61/893,987 titled "END-TO-END VIDEO DELAY MEASUREMENT," filed on Oct. 22, 2013, and listing Yong LIU, Yang XU and Chenguang YU as the inventors (referred to as "the '987 provisional" and incorporated herein by reference). The scope of the present invention is not limited to any requirements of the specific embodiments described in '987 provisional.

§1. BACKGROUND OF THE INVENTION

§1.1 Field of the Invention

The present invention concerns audio and video conferencing systems and services. In particular, the present invention concerns determining user perceived delays in audio and video conferencing systems and services.

§1.2 Background Information

The Internet has changed the way people communicate, supporting technologies including emails, text-messages, blogs, tweets, Voice-over-IP ("VoIP") calls, etc. We are now experiencing the next big change—video telephony. Due to its stringent bandwidth and delay requirements, for years, business customers have been paying high prices to utilize specialized hardware and software for video encoding, mixing and decoding, and dedicated network pipes for video distribution. Video telephony has had little success in the end-consumer market, until very recently. The proliferation of video-capable consumer electronic devices and the penetration of increasingly faster residential network accesses has paved the way for the wide adoption of video telephony. Two-party video chat and multi-party video conferencing services are now being offered for free or at low prices to end-consumers on various platforms. Notably, Apple iChat, Google+ Hangout, and Skype Video Calls are among the most popular video conferencing services on the Internet.

Video conferencing requires high-bandwidth and low-delay voice and video transmission. While Skype encodes high quality voice at data rate of 40 kbps, a Skype video call with good quality can easily use up bandwidth of 900 kbps. Although seconds of buffering delay is often tolerable even in live video streaming, in video conferencing, some have argued that user Quality-of-Experience ("QoE") degrades significantly if the one-way, end-to-end, video delay exceeds 350 milli-seconds. To deliver good conferencing experience to end-consumers over the best-effort Internet, video conferencing solutions have to cope with user device and network access heterogeneities, dynamic bandwidth variations, and random network impairments, such as packet losses and delays. All these have to be done through video generation and distribution in real-time, which makes the design space extremely tight.

Therefore, it would be useful to be able to measure end-to-end delays in video conferencing services, such as iChat, Google+, and Skype, for example. Such measurements could be used investigate how the various video conferencing services address video conferencing challenges and how well they do it on the Internet. However, it is challenging and ambitious to draw conclusions. Various different video conferencing services use proprietary protocols and encrypt data and signaling messages. There is limited public information about their architectures and protocols. As should be appreciated from the foregoing, it would be useful to be able to determine user perceived delays in audio and video conferencing systems and services.

§2. SUMMARY OF THE INVENTION

Example embodiments consistent with the present invention measure delays in audio and/or video conferencing systems and services, by treating such systems and services as black boxes, thereby providing end-to-end delays as they would be perceived by users.

§3. BRIEF DESCRIPTION OF THE DRAWINGS

§4. DETAILED DESCRIPTION

Figure 1:
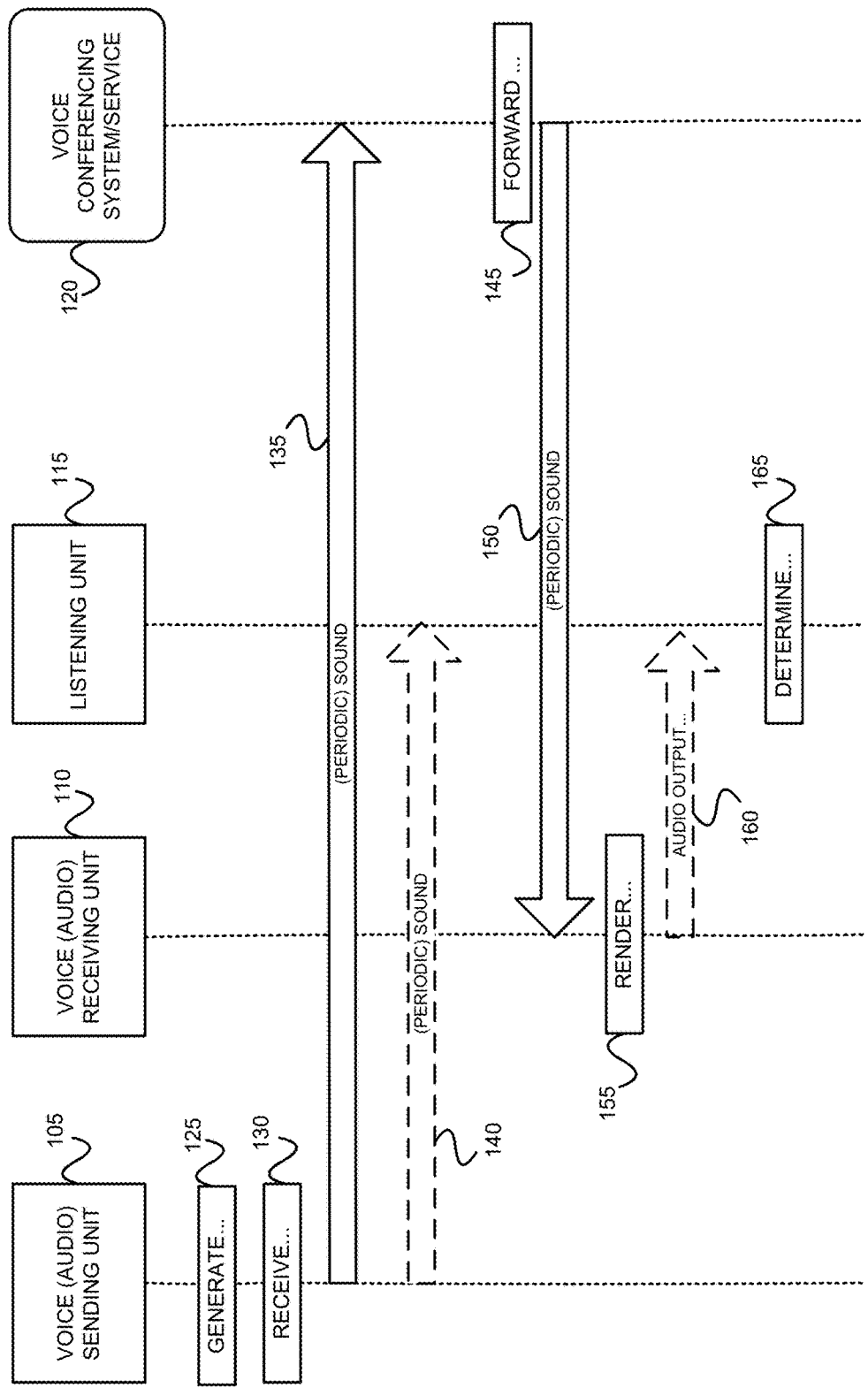
FIG. 1 is a combined messaging and flow diagram illustrating an example method for determining a one-way delay of a voice conferencing system or service, in a manner consistent with the present invention.

Example embodiments consistent with the present invention may involve novel methods, apparatus, message formats, and/or data structures for determining user perceived delays in audio and/or video conferencing systems and services. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, certain terms are defined in §4.1. Then, various example methods for determining one-way or round-trip delays in audio or video conferencing systems and services are described in §§4.2-4.6. Thereafter, example environments (or "measurement platforms") in which the various example methods may be run are described in §4.7. Finally, some conclusions are presented in §4.8.

§4.1 Definitions and Acronyms

"Video" in the context of "video conferencing" includes video and audio.

In some contexts, "SV" means a source stopwatch video (or a source stopwatch video snapshot). In other contexts, "SV" means a source video, which includes at least a stopwatch video.

"DSV" means displayed source stopwatch video (also referred to as "displayed SV").

"CDSV" means captured displayed source stopwatch video (also referred to as "captured DSV").

"SCDSV" means sent captured displayed source stopwatch video (also referred to as "sent CDSV").

"RCDSV" means received (sent) captured displayed source stopwatch video (also referred to as "received CDSV").

"DRCDSV" means displayed received captured displayed source stopwatch video (also referred to as "displayed RCDSV").

"CDRCDSV" means captured displayed received captured displayed source stopwatch video (also referred to as "captured DRCDSV").

"SCDRCDSV" means sent captured displayed received captured displayed source stopwatch video (also referred to as "sent CDRCDSV").

"RCDRCDSV" means received captured displayed received captured displayed source stopwatch video (also referred to as "received CDRCDSV").

A "user perceived delay" may include the end-to-end voice/video delay perceived by a user. Such a user perceived delay may include the sum of delays incurred by real-time voice/video capturing, encoding, transmission, decoding, and rendering. The end-to-end delay can be divided into four portions. Let $T_e$ be the voice/video capturing and encoding delay at the sender, $T_n$ be the one-way transmission and propagation delay on the network path between the sender and the receiver, if voice/video is relayed by server(s) or super-peer(s) along the network path, let $T_s$ be the aggregate processing time on relay devices ($T_s=0$, if there is no server or super-peer involved), and $T_d$ be the video or voice decoding and playback delay at the receiver. Thus, the one-way voice/video delay "T" may be defined as:

$$T=T_e+T_n+T_s+T_d$$

Since it is desired to understand user perceived delay, t is not sufficient to just measure the network transmission delay $T_n$. Therefore, the following example methods determine end-to-end delay by emulating a real user's experience.

An "audio conferencing system" is intended to include an audio conferencing service, as well as an audio conferencing system.

A "video conferencing system" is intended to include a video conferencing service, as well as a video conferencing system.

§4.2 Determining One-Way Delay of a Voice Conferencing System or Service

FIG. 1 is a combined messaging and flow diagram illustrating an example method for determining a one-way delay of a voice conferencing system or service, in a manner consistent with the present invention. This example method for measuring a user perceived one-way delay in a voice conferencing service includes:

a) generating a periodic sound (125);
b) receiving (130) the generated periodic sound by a sending unit 105, the sending unit 105 being at a first location;
c) transmitting (135, 145, 150), via the voice conferencing system/service 120, the received sound from the sending unit 105 to a receiving unit 110 at the same first location;
d) rendering (155), by the receiving unit 110, the sound to generate audio output (160);
e) receiving and recording, by a listening unit 115 at the same first location, both (1) periodic the sound (140) and (2) the audio output (160) rendered by the receiving unit 110; and
f) determining the user perceived one-way delay in the voice conferring service (165) based on a time difference between (1) a part of the periodic sound (140) directly received and recorded by the listening unit 115, and (2) a part of the audio output (160) rendered by the receiving unit 110 and received and recorded by the listening unit 115.

Figure 2:
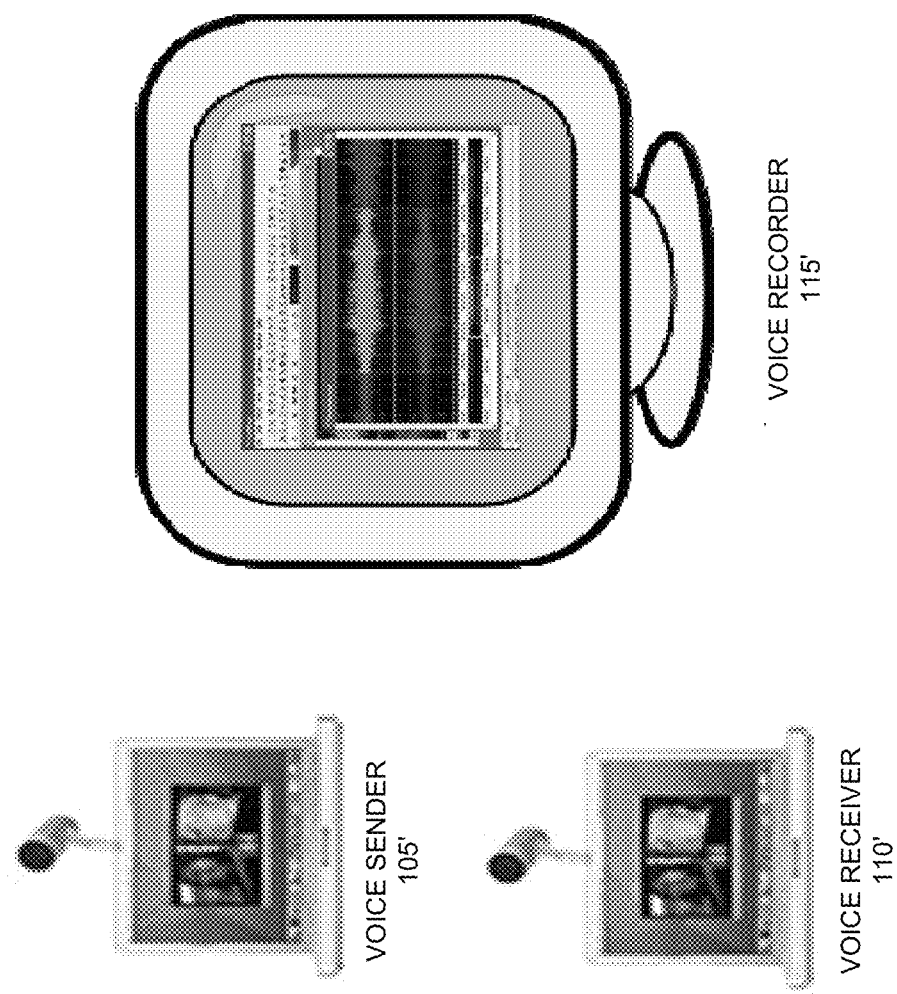
FIG. 2 illustrates components that may be used in a specific implementation of the example method of FIG. 1.

FIG. 2 illustrates components that may be used in a specific implementation of the example method of FIG. 1. To record one-way voice delay, a periodic TICK sound is used to simulate a voice source. The periodic TICK sound is injected into the voice sender using a microphone. FIG. 2 illustrates three (3) computers, set up side by side, in a local tested. One computer 105' operates as a voice sending unit 105, and another computer 110' operates as a voice receiving unit 110. The sender 105' periodically sends the TICK sound to the receiver 110' via a voice conferencing system or service (not shown). The third computer 115' emulates a user and "hears" (records) both the sound injected to the voice sender 105' and the sound rendered by the voice receiver 110'. The third computer 115' may use sound recording software, such as GoldWave (Homepage. http://www.goldwave.com/) for example. To avoid the received sound on the voice receiver 110' being looped back to the sender, the speaker on receiver 110' is placed close to the third computer 115', but relatively far away from the sender 105'

Figure 3A:
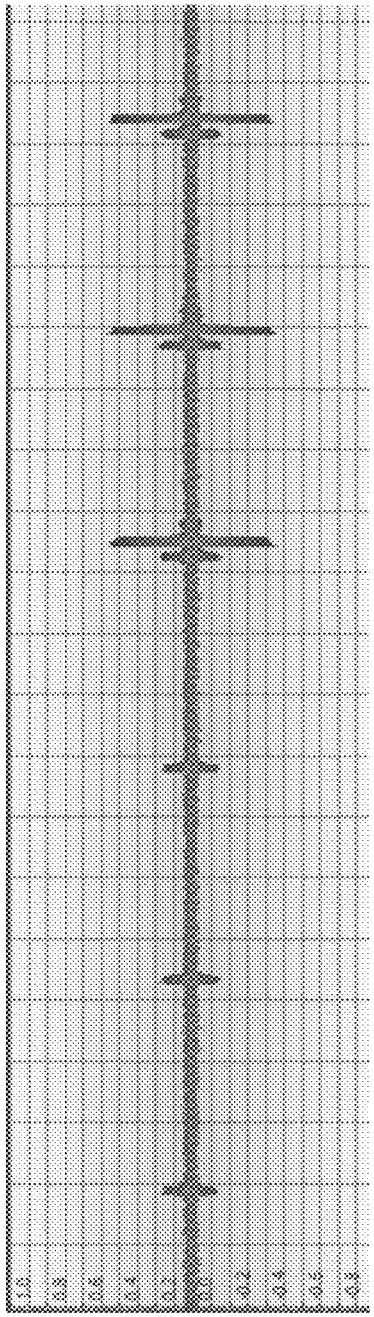
FIGS. 3A and 3B illustrate recorded and enlarged sound waves, respectively, that may be used in the example method of FIG. 1.
Figure 3B:
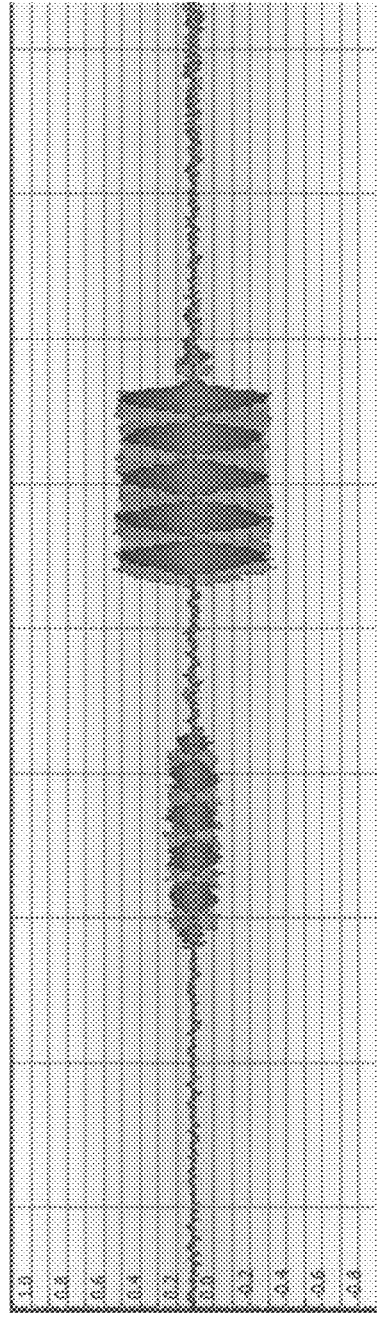

FIGS. 3A and 3B illustrate recorded and enlarged sound waves, respectively, that may be used in the example method of FIG. 1. More specifically, FIG. 3A illustrates a recorded sound wave sample. Note the two sequences of impulses at different amplitudes. By setting the volume of the sender's 105' speaker significantly lower than the volume of receiver's 110' speaker, the impulses with smaller amplitudes correspond to the repeated "TICKS" sent by the sender 105', while the impulses with larger amplitudes corresponds to the received "TICKS" received and rendered by the receiver 110'.

On the sender 105', the time interval between two TICKS is set to be about 1,000 ms (though other intervals may be used), which is larger than the expected voice delay. In this way, a large impulse can be matched with the preceding small impulse. FIG. 3B illustrates an enlarged view of the two adjacent sound impulses. Each impulse in this example a waveform segment with rich frequency components. The time-lags between the first peaks of two adjacent segments correspond to determined one-way voice delays.

Note that although the sounds (e.g., TICKS) may be periodic, example embodiments consistent with the foregoing method may use just a single sound. However, periodic sounds are useful because they provide multiple samples.

§4.3 Determining One-Way Delay of a Video Conferencing System or Service

Figure 4:
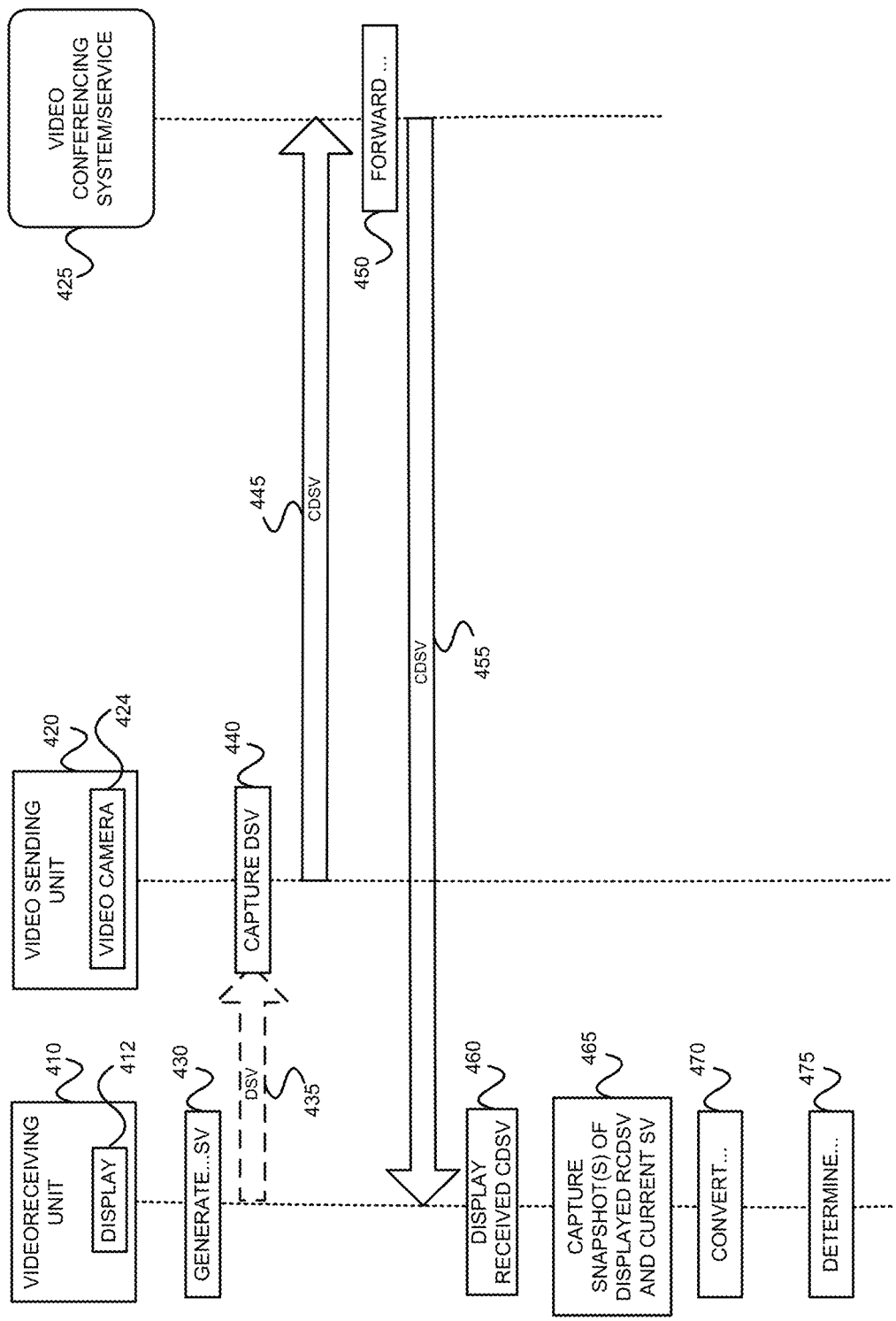
FIG. 4 is a combined messaging and flow diagram illustrating an example method for determining a one-way delay of a video conferencing system or service, in a manner consistent with the present invention.

FIG. 4 is a combined messaging and flow diagram illustrating an example method for determining a one-way delay of a video conferencing system or service, in a manner consistent with the present invention. This example method for measuring a user perceived one-way delay in a video conferencing service includes:

a) running a stopwatch program on a receiving unit 410 at a first location to generate (430) a source stopwatch video ("SV") displayed on a display device 412 associated with the receiving unit 410;

b) capturing (440), with a video camera 424 associated with a sending unit 420 at the same first location, the rendered video (435) of the displayed SV ("DSV");

c) sending (445, 450, 455), via the video conferencing system/service 425, the captured DSV ("CDSV") from the sending unit 420 to the receiving unit 410;

d) receiving (455), by the receiving unit 410, the sent CDSV ("SCDSV");

e) displaying (460), by the receiving unit 420, the received SCDSV ("RCDSV") on a display device 422 associated with the receiving unit 420, thereby generating a display screen including both (1) a current stopwatch video, and (2) the RCDSV;

e) capturing (465) a snapshot of the display screen including both (1) the current stopwatch video, and (2) the RCDSV;

f) converting (470) (1) the current stopwatch video in the captured snapshot to a first stopwatch value, and (2) the RCDSV in the captured snapshot to a second stopwatch value; and g) determining (475) the user perceived one-way delay in the video conferring service based on a time difference between the first stopwatch value and the second stopwatch value.

Note that the video of the stopwatch can be combined with a standard video sequence (as described in other embodiments below).

Figure 5:
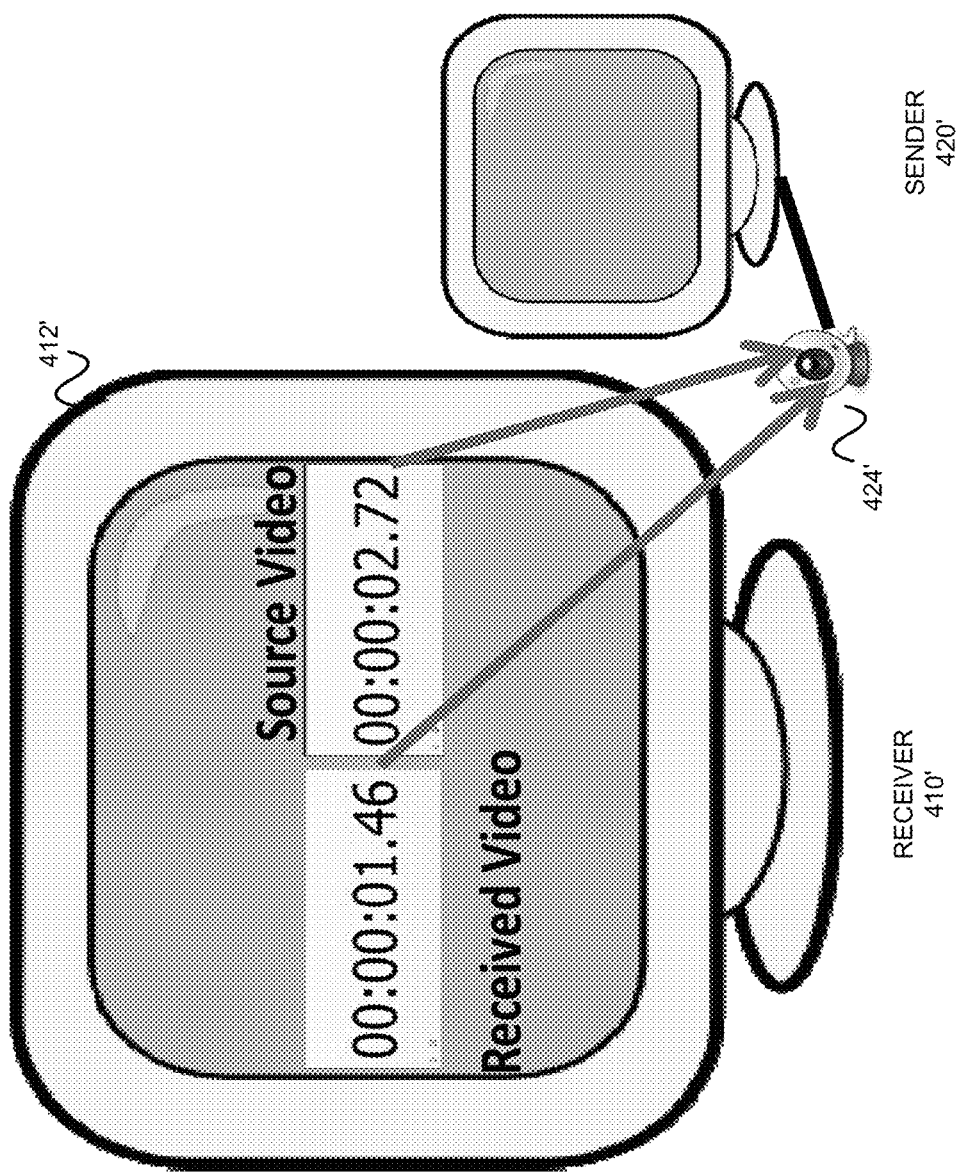
FIG. 5 illustrates components that may be used in a specific implementation of the example method of FIG. 4.

FIG. 5 illustrates components that may be used in a specific implementation of the example method of FIG. 4. To measure video delay, a user's video experience is emulated by simultaneously "viewing" (recoding) the original video on the sender and the received video on the receiver using a video capturing program. As illustrated in FIG. 5, two (2) computers 410' and 420' are provided side-by-side in a local tested, one as the sender 420', and the other as the receiver 410'. A stopwatch program (See, e.g., Free Stopwatch. Homepage at http://free-stopwatch.com/.) is run on the receiver side 410', and the sender's 420' video camera 424' captures the stopwatch window on the receiver's 410' screen 412'. The sender 420' transmits the stopwatch video captured from the receiver screen 412' back to the receiver 410' via the video conferencing system (not shown). There are now two stopwatch videos on the receiver's screen 412': the current stopwatch video, and the copy captured by the sender 420' and then transmitted back through the video conferencing system. At any given time, the difference between the two stopwatches is the one-way end-to-end video delay perceived by the receiver 410'. For the example in FIG. 5, the current stopwatch shows time "00:00:02.72" seconds and the received copy of the earlier stopwatch shows time "00:00:01.46" seconds. Thus, the video delay in this case is 1,260 ms.

In one example, implementation, a software program running on the receiver 410' is used to capture the snapshots of the receiver's screen 412' ten times every second. Software (See, e.g., Comic Enhancer Pro. Homepage at http://www.comicer.com/stronghorse.) may then be used to convert the captured pictures into mono-color, and extract stopwatch images from the mono-color pictures. Finally, the stopwatch readings may be decoded from stopwatch images using Optical Character Recognition ("OCR") software, such as FreeOCR. (Homepage at http://www.freeocr.net/) for example. It should be noted that if the received video quality is poor in some samples, the OCR software might not be able to decode the stopwatch readings correctly. Such undecodable samples may be skipped in the delay calculation. The ratio of undecodable pictures to decodable pictures, or to total pictures, can also be used to infer the received video quality.

Figure 6:
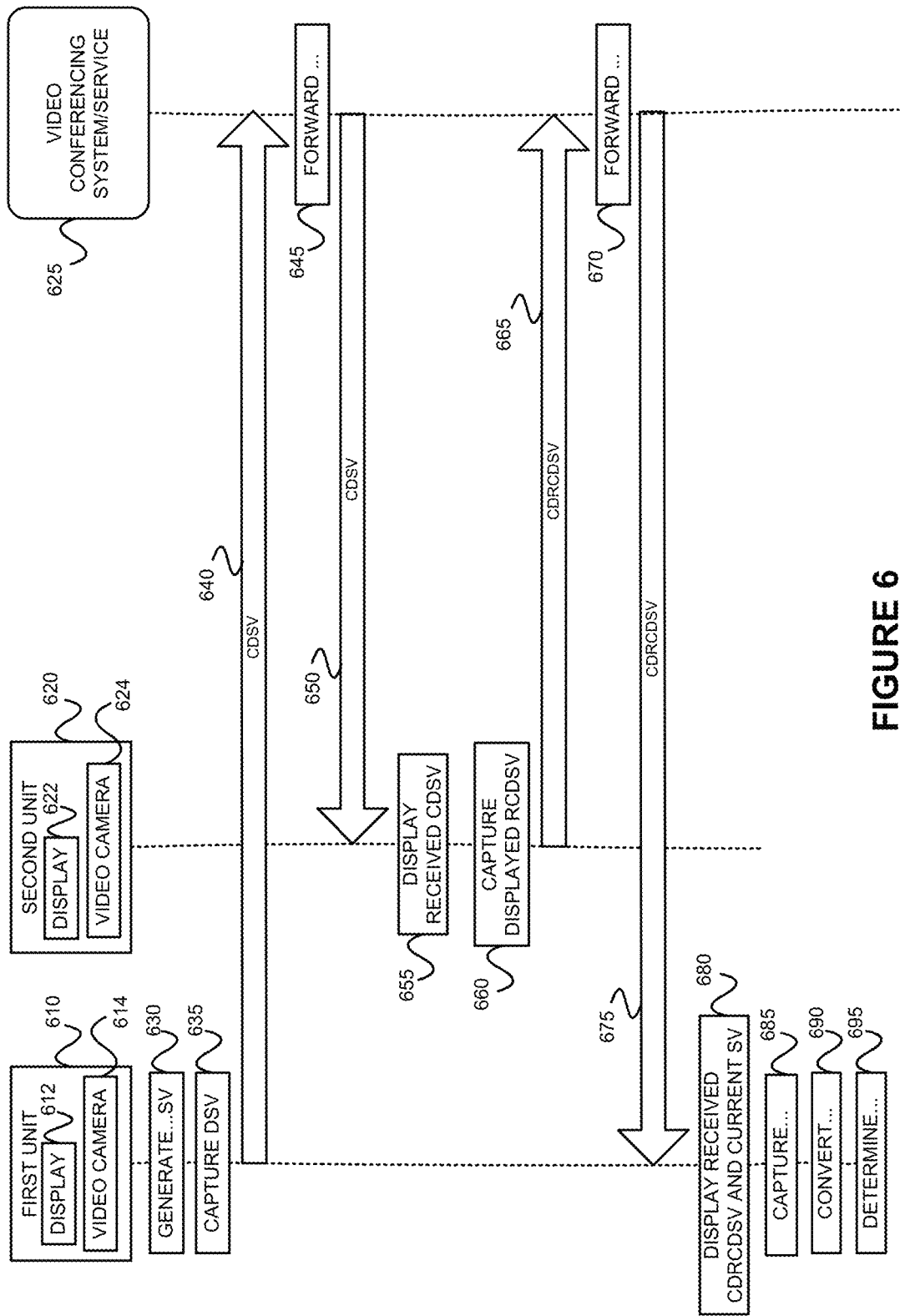
FIG. 6 is a combined messaging and flow diagram illustrating an example method for determining a round-trip delay of a video conferencing system or service, in a manner consistent with the present invention.

§4.4 Determining Round-Trip (and One-Way) Delay of a Video Conferencing System or Service The method of FIG. 4 does not work if the sender and the receiver are not in the same location. Another method to measure the round-trip video delay between two geographically distributed computers is described in this section. FIG. 6 is a combined messaging and flow diagram illustrating an example method for determining a round-trip delay of a video conferencing system or service, in a manner consistent with the present invention. This example method for measuring a user perceived delay in a video conferencing service includes:

a) running a stopwatch program on a first unit 610 at a first location to generate (630) on a display device 612 associated with the first unit 610, a source stopwatch video ("SV");

b) capturing (635), with a video camera 614 associated with the first unit 610, video of the displayed SV ("DSV");

c) sending (640, 645,650), via the video conferencing system/service 625, the captured DSV ("CDSV") from the first unit 610 to a second unit 620, at a second location remote from the first location 610;

d) receiving (650), by the second unit 620, the sent CDSV ("SCDSV");

e) displaying (655), on a display device 622 associated with the second unit 620, the received SCDSV ("RCDSV");

f) capturing (660), with a video camera 624 associated with the second unit 620, video of the displayed RCDSV ("DRCDSV");

g) sending (665, 670, 675), via the video conferencing system/service 625, the captured DRCDSV ("CDRCDSV") from the second unit 620 back to the first unit 610;

h) receiving (675), by the first unit 610, the sent CDRCDSV ("SCDRCDSV");

i) displaying (680), by the first unit 610, the received SCDRCDSV ("RCDRCDSV") on the display device 612 associated with the first unit 610, thereby generating a display screen including both (1) a current source stopwatch video, and (2) the RCDRCDSV;

j) capturing (685) a snapshot of the display screen including both (1) a current source stopwatch video, and (2) the RCDRCDSV;

k) converting (690) (1) the current source stopwatch video in the captured snapshot to a first stopwatch value, and (2) the RCDRCDSV in the captured snapshot a second stopwatch value; and l) determining (695) a user perceived round-trip delay in the video conferring service based on a time difference between the first stopwatch value and the second stopwatch value.

Note that a user perceived one-way delay may be determined based on the determined user perceived round-trip delay (e.g., by dividing it by two).

Figure 7:
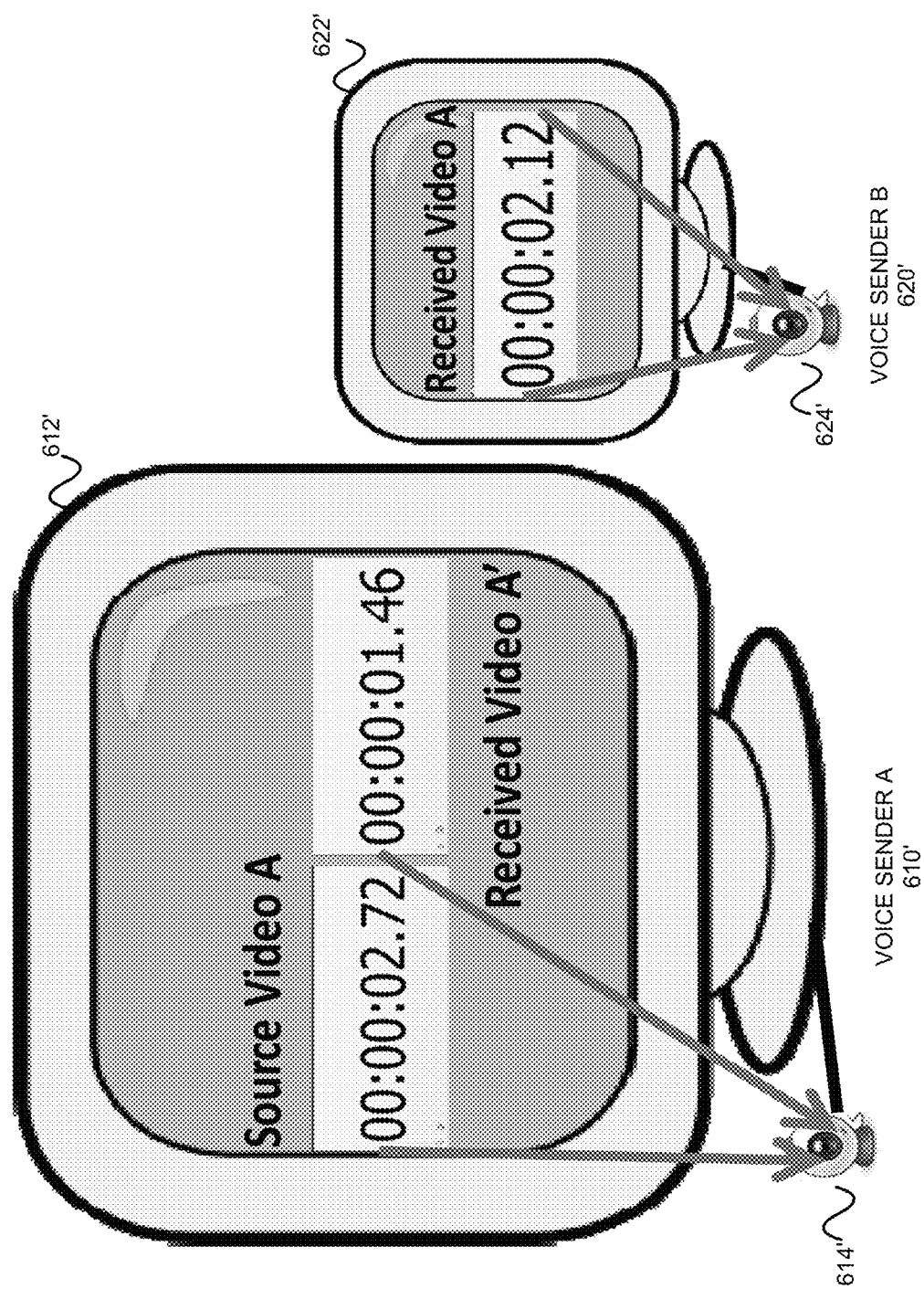
FIG. 7 illustrates components that may be used in a specific implementation of the example method of FIG. 6.

FIG. 7 illustrates components that may be used in a specific implementation of the example method of FIG. 6. As illustrated in FIG. 7, a stopwatch program is run on video sender A 610' (which corresponds to the first unit 610 of FIG. 6). The camera 614' of video sender A 610' is used to capture the stopwatch video (as a source video) displayed on the display 612'. The captured stopwatch video is then transmitted to video sender B 620' (which corresponds to the second unit 620 of FIG. 6) using a video conferencing system or service (not shown). The received stopwatch video is now displayed on the display 622' of video sender B 620'. This display is then captured by the camera 624' of video sender B 620'. Video sender B then sends the captured video back to video sender A 610' via the same video conferencing system or service. The display 612' of video sender A 610' will then display two stopwatch videos: the current one, and the one that was first sent to video sender B 620', recaptured and sent back to video sender A 610'. The clock difference between the two stopwatches on the display 612' reflects the summation of one-way video delay from video sender A 610' to video sender B 620', and the one-way video delay from video sender B 620' back to video sender A 610' (as well as encoding and decoding delays). Thus, the difference between stopwatches on the display 612' represents the round-trip video delay. If it is assumed that the two directions are symmetric, then the one-way video delay will be roughly half of the round-trip delay.

Note that once the cameras on video senders A and B are properly positioned, only screen shots on the display 612' of video sender A 610' need be analyzed.

In one example, implementation, a software program running on the video sender a 610' is used to capture the snapshots of the display 612' screen ten times every second. Software, such as Comic Enhancer Pro for example, may then be used to convert the captured pictures into mono-color, and extract stopwatch images from the mono-color pictures. Finally, the stopwatch readings may be decoded from stopwatch images using Optical Character Recognition ("OCR") software, such as FreeOCR. It should be noted that if the received video quality is poor in some samples, the OCR software might not be able to decode the stopwatch readings correctly. Such undecodable samples may be skipped in the delay calculation. The ratio of undecodable pictures to decodable pictures, or to total pictures, can also be used to infer the received video quality.

§4.5 Determining One-Way Delay of a Mobile Video Conferencing System or Service

Figure 8:
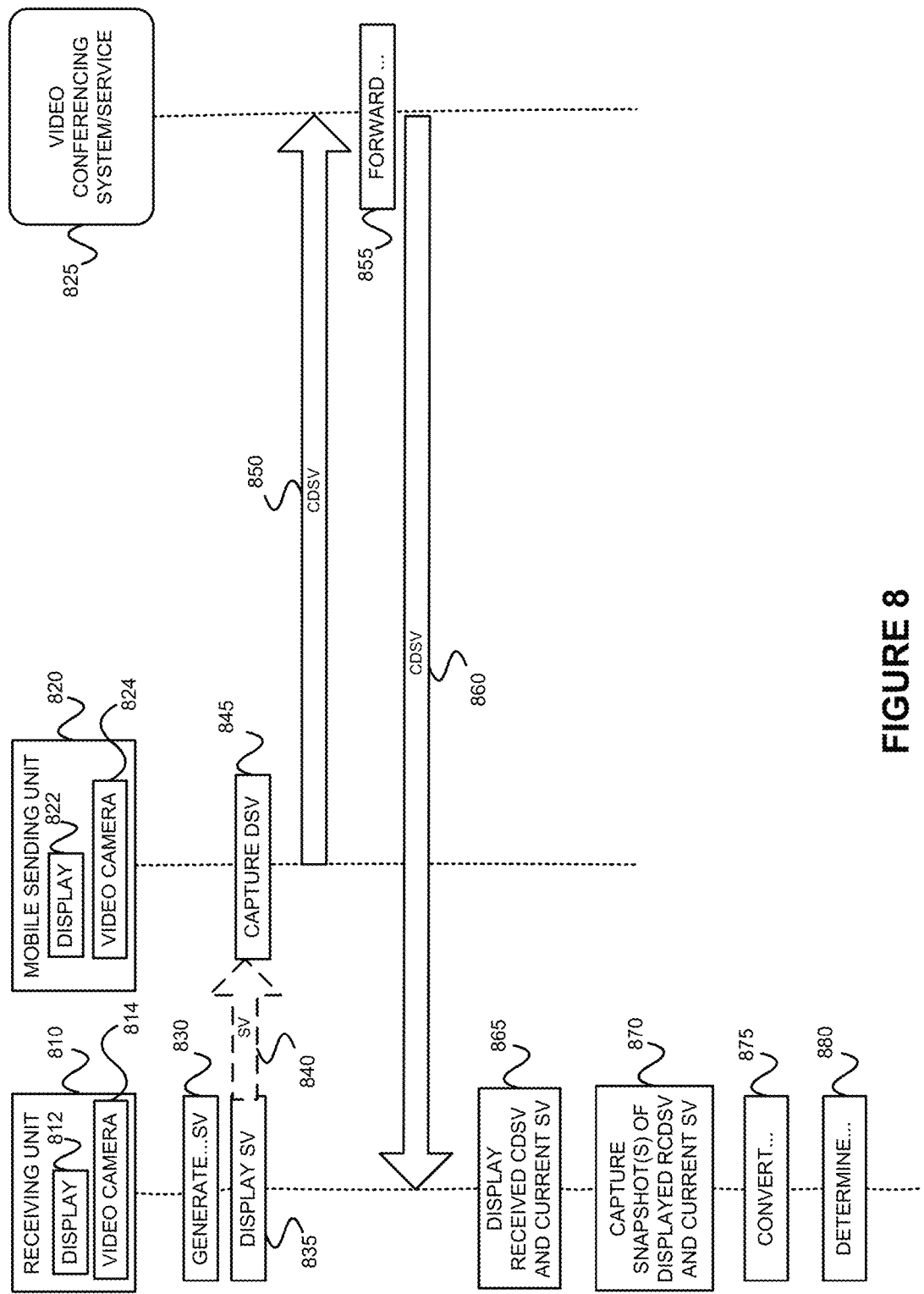
FIG. 8 is a combined messaging and flow diagram illustrating an example method for determining a one-way delay of a mobile video conferencing system or service, in a manner consistent with the present invention.

FIG. 8 is a combined messaging and flow diagram illustrating an example method for determining a one-way delay of a mobile video conferencing system or service, in a manner consistent with the present invention. This example method for measuring a user perceived one-way delay in a mobile video conferencing service includes:

a) running a stopwatch program on a receiving unit 810 at a first location;

b) generating (830) and displaying (835) on a display device 812 associated with the receiving unit 810, a source video ("SV") including both (1) a standard test video and (2) a source stopwatch video from the stopwatch program;

c) capturing (845), with a video camera 824 associated with a mobile sending unit 820 at the first location, the displayed SV ("DSV") (840);

d) sending (850, 855, 860), via the video conferencing system/service (825), the captured DSV ("CDSV") from the mobile sending unit 820 to the receiving unit 810;

e) receiving (860), by the receiving unit 810, the sent CDSV ("SCDSV");

f) displaying (865), by the receiving unit 810, the received SCDSV ("RCDSV") on the display device 812, thereby generating a display screen including both (1) a current source video, including both (i) a current standard test video and (ii) a current source stopwatch video, and (2) the RCDSV;

g) capturing (870) a snapshot of the display screen including both (1) the current source video, and (2) the RCDSV;

h) converting (875) (1) a portion of the current source video in the captured snapshot to a first stopwatch value, and (2) a portion of the RCDSV in the captured snapshot to a second stopwatch value; and i) determining (880) the user perceived one-way delay in the mobile video conferring service based on a time difference between the first stopwatch value and the second stopwatch value.

Figure 9:
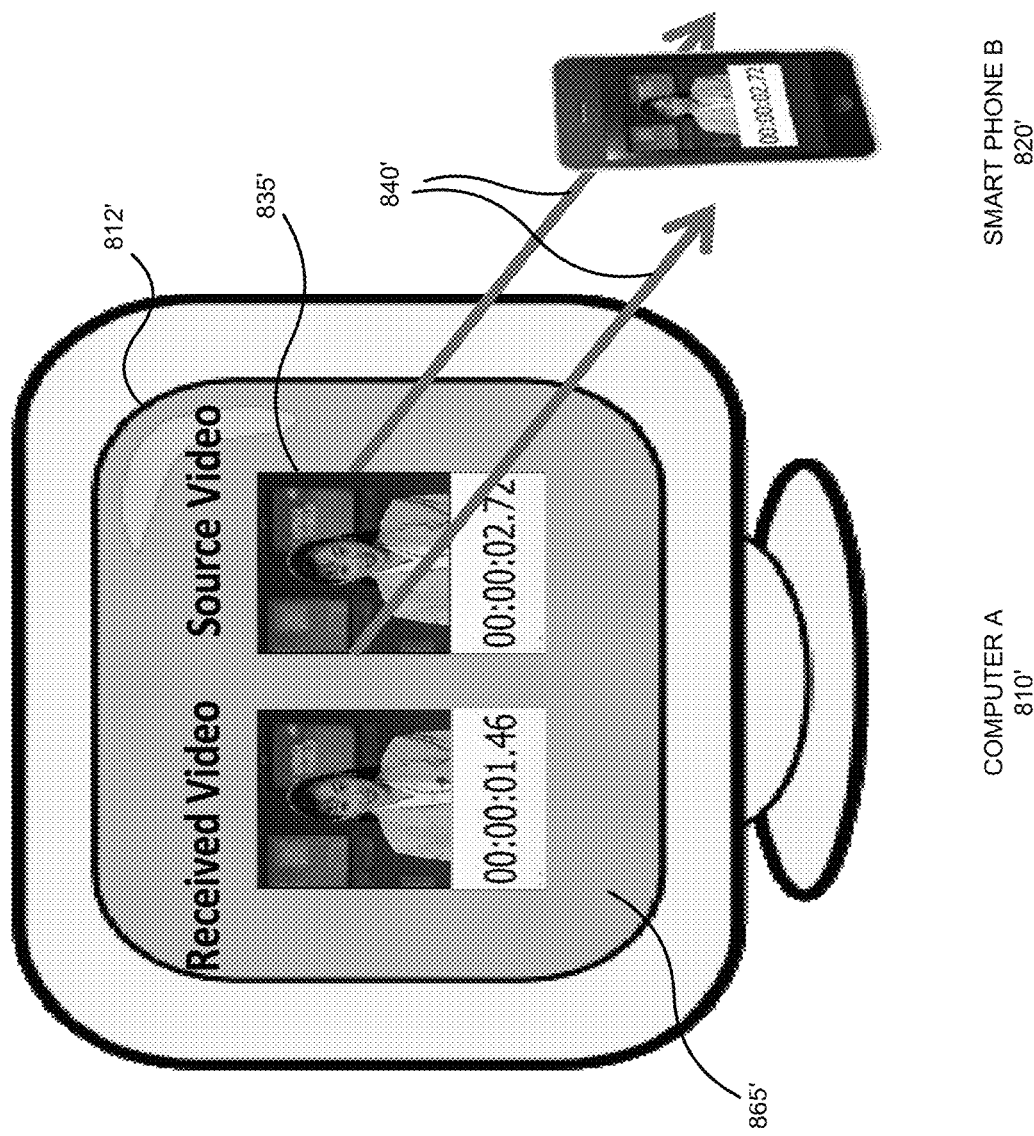
FIG. 9 illustrates components that may be used in a specific implementation of the example method of FIG. 8.

FIG. 9 illustrates components that may be used in a specific implementation of the example method of FIG. 8. As shown in FIG. 9, to measure the one-way video delay of a video call, computer A 810' (which corresponds to the receiving unit 810 of FIG. 8) and smart phone B 820' (which corresponds to the mobile sending unit 820') are arranged close to each other. The "Akiyo" video from Joint Video Team ("JVT". See http://www.itu.int/en/ITU-T/study-groups/com16/video/Pages/jvt.aspx.) is being played on computer A 810'. Meanwhile, a stopwatch application is also running on computer A 810'. A video call is initiated between computer A 810' and smart phone B 820', with the camera (not shown) of the smart phone B capturing the "Akiyo+Stopwatch" video on the screen 812'. Through the video call application, smart phone B 820 sends the captured "Akiyo+Stopwatch" video back to computer A 810'. On the display 812' of computer A 810', the received video window is arranged next to a current source video window. By comparing the captured portions from a snapshot including the two stopwatch videos on the display screen 812' of computer A 810' screen, the one-way video delay from smart phone B 620' to computer A 610' can be determined.

In one implementation, to automatically collect video delay information from the two stopwatches, a script is used to capture the screen of the display 812' of computer A 810 once every 100 milliseconds. The captured stopwatch images are then decoded using Optical Character Recognition ("OCR") software.

Figure 10:
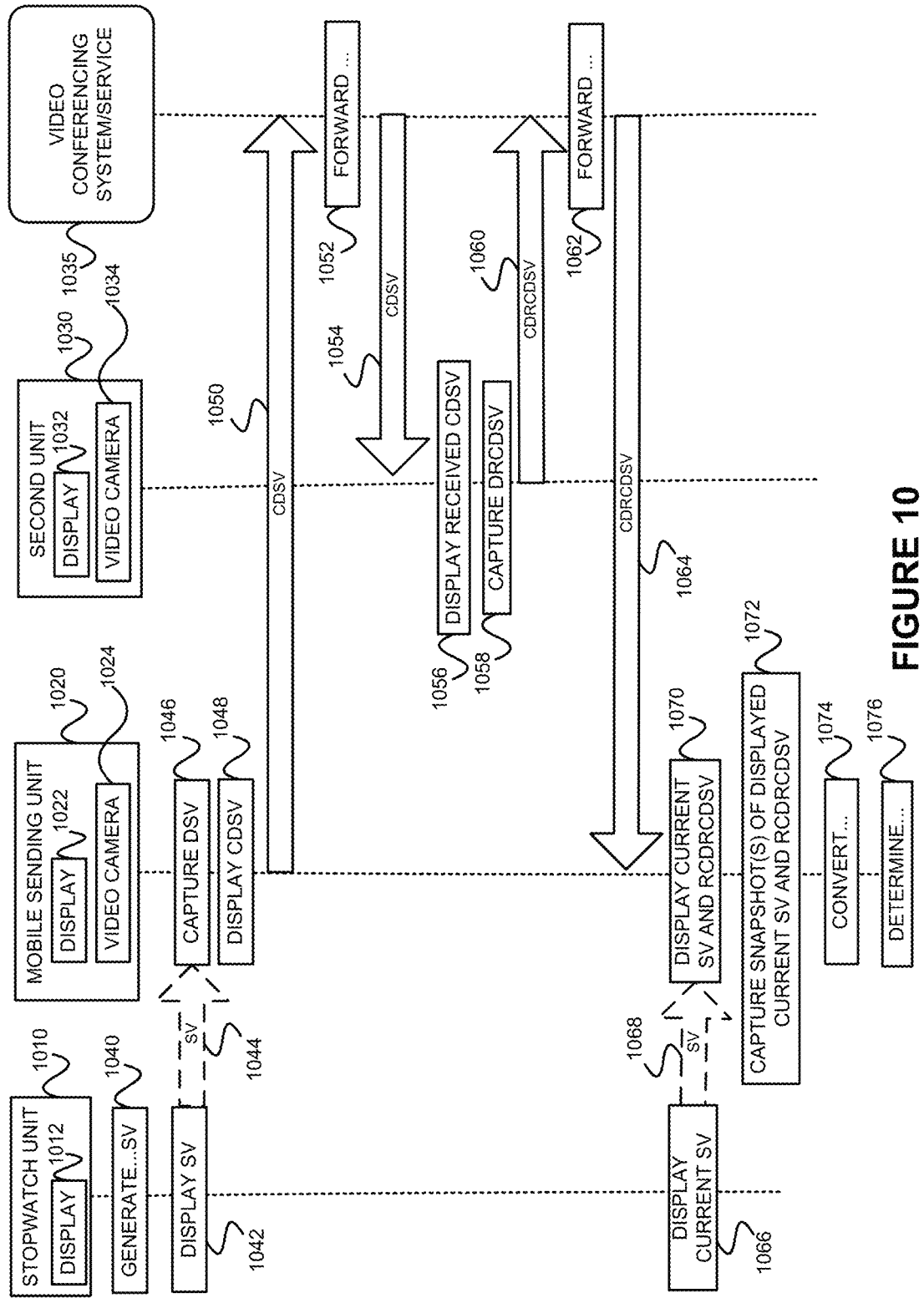
FIG. 10 is a combined messaging and flow diagram illustrating an example method for determining a round-trip delay of a mobile video conferencing system or service, in a manner consistent with the present invention.

§4.6 Determining Round-Trip Delay of a Mobile Video Conferencing System or Service When the phone and computer are not at the same location (e.g., in mobility experiments on a subway), the one-way delay cannot be measured using the method of FIG. 8. FIG. 10 is a combined messaging and flow diagram illustrating an example method for determining a round-trip delay of a mobile video conferencing system or service, in a manner consistent with the present invention. This example method for measuring a user perceived round-trip delay in a mobile video conferencing service, the method includes:

a) running (1040) a stopwatch program on a stopwatch unit 1010 at a first location, to generate on a display device 1012 associated with the stopwatch unit 1010, a display (1042) including a source stopwatch video ("SV") from the stopwatch program;

b) capturing (1046), with a video camera 1024 associated with a mobile sending unit 1020 at the first location, video of the displayed SV ("DSV") (1044);

c) displaying (1048), on a display device 1022 associated with the mobile unit 1020, the captured DSV ("CDSV");

d) sending (1050, 1052, 1054), via the video conferencing system/service (1035), the CDSV from the mobile unit 1020 to a second unit 1030;

e) receiving (1054), by the second unit 1030, the sent CDSV ("SCDSV");

f) displaying (1056), by the second unit 1030, the received SCDSV ("RCDSV");

g) capturing (1058), by a video camera 1034 of the second unit 1030, video of the displayed RCDSV ("DRCDSV");

h) sending (1060, 1062, 1064), via the video conferencing system/service 1035, the captured DRCDSV ("CDRCDSV") from the second unit 1030 to the mobile sending unit 1020;

i) receiving (1064), by the mobile sending unit 1020, the sent CDRCDSV ("SCDRCDSV");

j) generating, by the mobile unit, a display (1070) screen including both (1) a current source stopwatch video (1068), and (2) the received SCDRCDSV ("RCDRCDSV");

k) capturing (1072) a snapshot of the display screen of the mobile unit 1020 including both (1) the current source stopwatch video, and (2) the RCDRCDSV;

l) converting (1074) (1) a portion of the current source stopwatch video to a first stopwatch value, and (2) a portion of the RCDRCDSV to a second stopwatch value; and m) determining (1076) the user perceived round-trip delay in the mobile video conferencing service based on a time difference between the first stopwatch value and the second stopwatch value.

Figure 11:
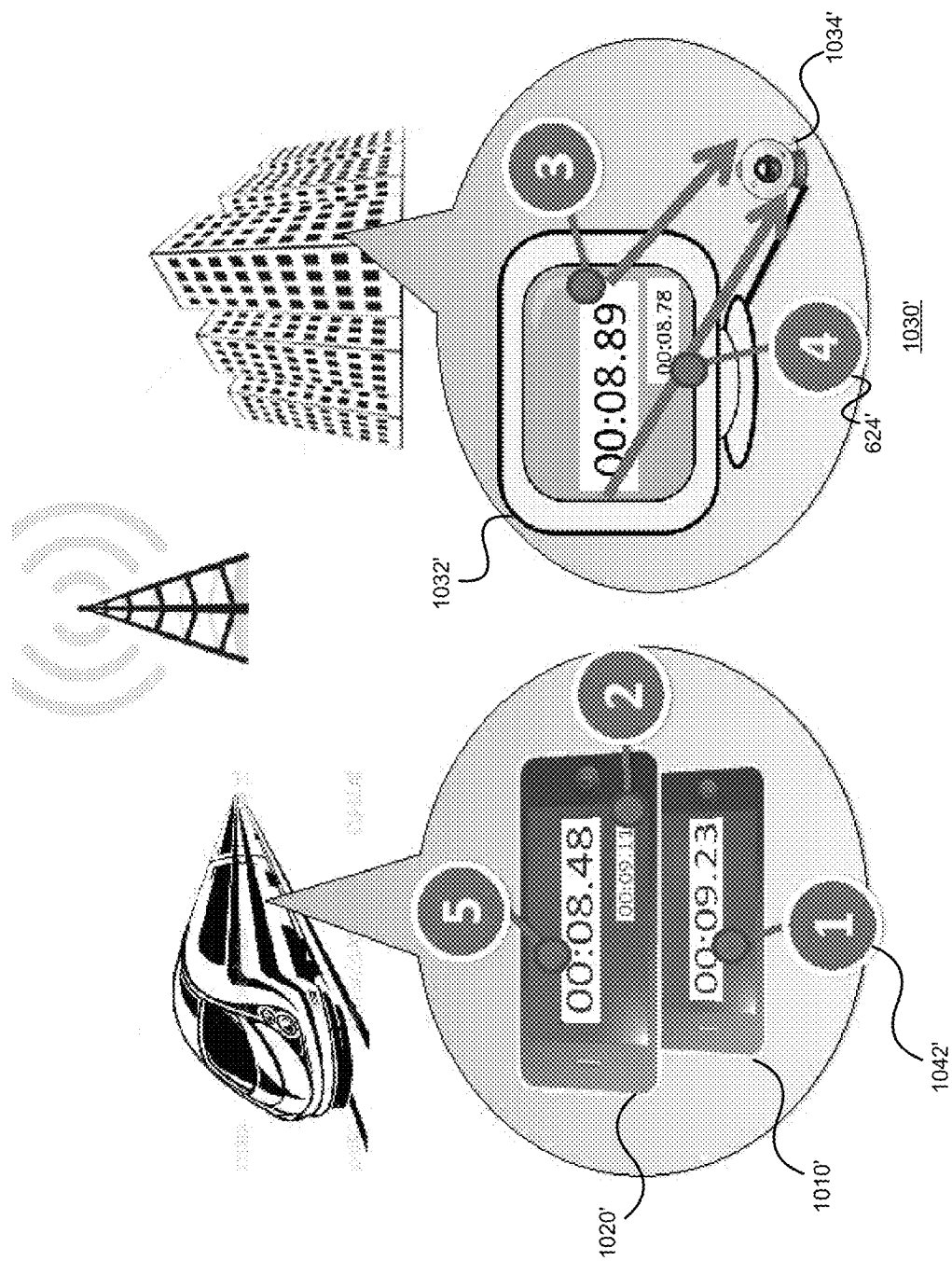
FIG. 11 illustrates components that may be used in a specific implementation of the example method of FIG. 10.

FIG. 11 illustrates components that may be used in a specific implementation of the example method of FIG. 10. In this specific implementation, there are a total of five stopwatch videos (or displays) during a video call. Stopwatch 1 1042' is a stand-alone application running on a separate Android phone 1010' (which corresponds to stopwatch unit 1010 of FIG. 10). Note that a physical stopwatch or a stopwatch function on a physical watch can be used instead. During a video call, the smart phone 1020' (which corresponds to the mobile sending unit 1020 of FIG. 10) captures the Stopwatch 1. The captured stopwatch 1, as displayed on the smart phone 1020, is marked as stopwatch 2. The captured stopwatch video is then sent, via the video conferencing system/service (not shown), to the receiving computer 1030' (which corresponds to second unit 1030 of FIG. 10), on which it is displayed as stopwatch 3. After this, the receiving computer 1030' focuses its own video camera 1034' on the received stopwatch 3 on its own screen 1032', and the captured video, marked as 4, is sent back to the smart phone 1020' through the video conferencing system. The smart phone finally displays the video received from the receiving computer 1030' on its screen, marked as stopwatch 5. Round-trip video delay can be calculated the reading difference between stopwatch 2 and stopwatch 5. Similar to the one-way delay measurement, by periodically capturing the smart phone's 1020 screen using a script and analyzing the captured images using OCR, a large number of round-trip video delay measurements can be determined.

§4.7 Example Measurement Platforms

Figure 12:
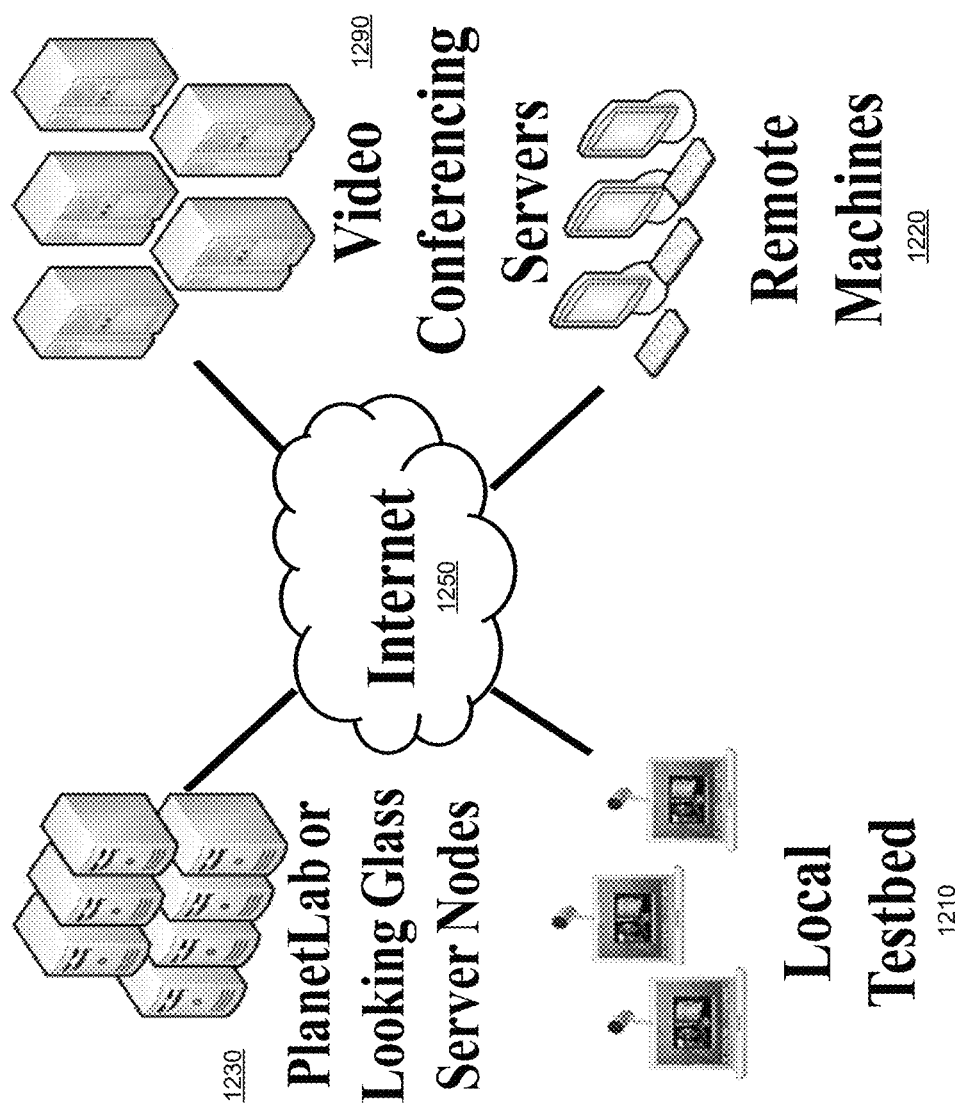
FIG. 12 illustrates an example tested environment in which various example methods consistent with the present invention may be used.

FIG. 12 illustrates an example tested environment (also referred to as "measurement platform") 1200 in which various example methods for determining user perceived delays in an audio or video conferencing system/service 1290 consistent with the present invention may be used. This example measurement platform includes a local tested (e.g., within a campus network) 1210, remote machines (e.g., geographically distributed all over the world) 1220; and Planetlab (See Homepage at http://www.planet-lab.org/.) and Glass Server (See, e.g.,] Traceroute.org. Homepage at http://www.traceroute.org/.) nodes 1230 at selected locations, all of which can communicate with one another and with the video conferencing system/service 1290 via the Internet 1250.

Experimental video calls used in the any of the above-described methods may be established either only between local machines within the local tested 1210, or between local machines within the local testbed 1210 and remote machines 1220. Planetlab and Glass Server nodes 1230 may be used to geolocate video conferencing servers of the video conferencing system/service (e.g., Skype, Google+ Hangout, Apple's iChat., etc.) 1290 using active probing. To emulate a video call, a standard TV news video sequence (e.g., "Akiyo" from JVT (Joint Video Team) test sequence pool) may be used. Such a sequence has mostly head and shoulder movements, and is therefore very similar to a video-call scenario. The video sequence may be injected into the appropriate system(s) using a virtual video camera tool, such as e2eSoft. Vcam: Webcam emulator (at http://www.e2esoft.cn/vcam/) for example. This ensures the transmitted video contents are consistent and repeatable.

Figure 13:
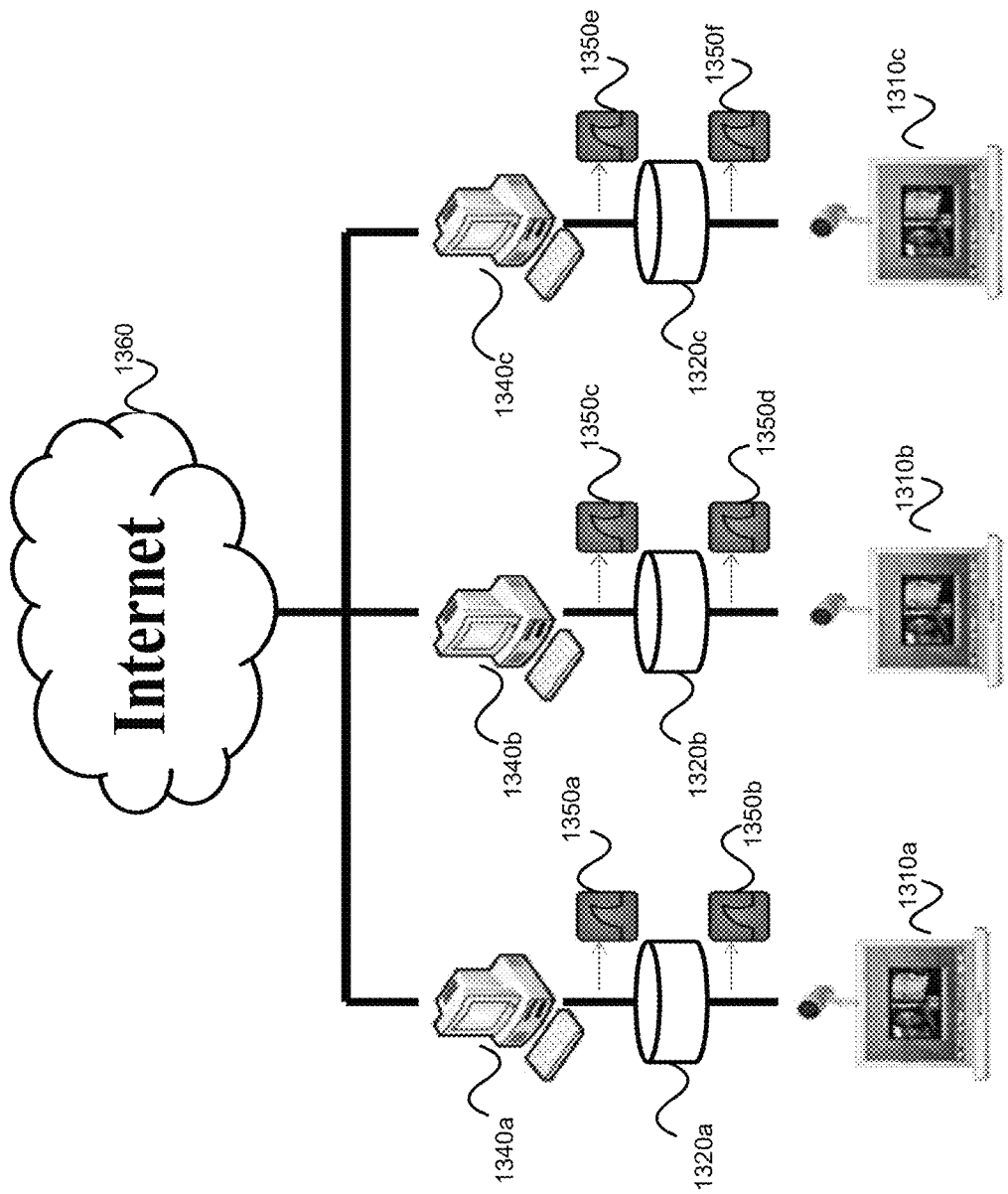
FIG. 13 illustrates an example local tested environment in which various example methods consistent with the present invention may be used.

FIG. 13 illustrates an example local tested environment 1300 in which various example methods consistent with the present invention may be used. To emulate a wide range of network conditions, a software-based network emulator (e.g., NEWT Microsoft Resarch Asia. Network Emulator for Windows Toolkit (NEWT) at http://blogs.msdn.com/b/lkruger) 1320 may be installed on local machines of the local tested 1210. Such a network emulator 1320 may be used to emulate a variety of network attributes, such as propagation delay, random or bursty packet loss, and available network bandwidth. A network monitoring tool (e.g., Wireshark, homepage at http://www.wireshark.org/) 1350 may be used to capture detailed packet-level information before and after the network emulators 1320. Video conferencing systems/services iChat, Google+ and Skype all report technical information about video quality through application window, such as video rates, frame rates, RTT, etc. (See, e.g., the paper, Y.-F. Ou, T. Liu, Z. Zhao, Z. Ma, and Y. Wang. Model the impact of frame rate on perceptual quality of video. In *Proc. of IEEE ICIP,* 2008, incorporated herein by reference.) A screen text capture tool (e.g., Renovation Software. Text grab for windows, at http://www.renovation-software.com/en/text-grab-sdk/textgrab-sdk.html.) may be used to capture this information periodically. The sampling interval may be set to one second, or some other appropriate time.

In the context of determining user perceived delays in a mobile video conferencing system, information of video calls may be collected from multiple channels. The example system 1200 may perform IP packet traces by sniffing packets at both the computer side (e.g., with Wireshark) and the smart phone side (e.g., with command line tcpdump). Collected packet traces may be used to analyze protocols and calculate network level statistics, such as packet delay, packet loss, and loss burst, etc. Video quality logs may be generated as follows. At the computer side, Skype and Google+ report technical information about the received video quality (such as video rates, frame rates, RTT, etc. (See, e.g., RTP protocol Fields. Homepage at http://www-.networksorcery.com/enp/protocol/rtp.htm.)) through their application windows. A screen text capture tool (e.g., Renovation Software. Text grab for windows, at http://www.renovation-software.com/en/text-grab-sdk/textgrab-sdk.html) may be used to capture this information periodically.

In the context of determining user perceived delays in mobile video conferencing services (Recall, e.g., FIGS. 10 and 11), a wireless measurement platform may include a wireless user side and a wireline user side. At the wireless user side, a smart phone 1020/1020' may be connected to the Internet through WiFi or a cellular data service provided by a carrier. At the wireline user side 320, a PC or Mac computer 1030 may be connected to the Internet via Ethernet. Software-based network emulators may be inserted on both ends of the connection to emulate network conditions in controlled experiments. Packet traces may be captured at different points using Wireshark. Experimental video calls may be established between the smart phone 1020/1020' and the computer 1030. To emulate a consistent and repeatable video call, a standard TV news video sequence (e.g., "Akiyo" from JVT (Joint Video Team) test sequence pool) may be used. As noted above, this sequence has mostly head and shoulder movements, and is therefore very similar to a video-call scenario. This video sequence may be injected into the video call systems, at the computer side, using a virtual video camera tool (e.g., e2eSoft. Vcam: Webcam emulator, at http://www.e2esoft.cn/vcam/). If a virtual camera tool is not available for a particular smart phone, the smart phone's camera may be used to capture a screen displaying the "Akiyo" video.

Since Facetime is only available on Apple devices, an iPhone may be used for some delay experiments. The integrated/closed hardware and software design of iPhone significantly increases the measurement difficulty, but it is possible to use several stages of hacks to prepare the smart phone for use in the foregoing delay determination methods. Such hacks may include: privilege escalation (e.g., using a unlocked iPhone 4S, which underwent jailbreak to allow third-party application installation (See, e.g., redsn0w. Homepage at http://blog.iphone-dev.org/.)); measurement tool installation (downloading tools from multiple sources listed in Table 1 of the '987 provisional); and remote phone control (Video conferencing services such as iChat, Google + Hangout and Skype are, by default, on single task mode. Consequently, if one switches to another application, the ongoing call will be put on hold and the video will freeze. To run tcpdump or ping on the iPhone during a video call, one may use a computer or another Android phone (e.g., Google Nexus 4) to login and control the iPhone via SSH, which will not interrupt the video call application. For experiments without mobility, one may connect the phone to a computer via a USB cable. Software called iTool on the computer may be used to build a USB tunnel between the local host and the iPhone. Then, the iPhone can be accessed from the computer using the command ssh 127.0.0.1 directly. For experiments on a moving train, it is not convenient to use a control computer, so one may instead control the iPhone using another Android phone. In such a scenario, one may set the iPhone to WiFi ad-hoc mode using MyWi, after which the Android phone can access and control the iPhone via SSH over WiFi.)

To test performance under different wireless conditions, a set of WiFi and Cellular experiments with both weak and strong signals may be used. Mobile users experience different network conditions when they are in different locations. Therefore, it may be desirable to choose several typical locations which can represent strong signal case or weak signal case. SpeedTest may be used to verify the actual upload throughput. In WiFi experiments, upload throughput for strong signal locations may be set to be above 10 mbps, and upload throughput for weak signal locations may be set to be around 200-300 kbps. In Cellular experiments, upload throughput for strong signal locations may be set to be above 1,000 kbps, and upload throughput for weak signal locations may be set to be around 100-150 kbps. To test video call performance with mobility, experiments may be conducted on subway trains when they run on the ground for example. For controlled experiments, a software network emulator (e.g., NEWT) may be used to emulate a variety of network attributes, such as propagation delay, random packet loss, and available bandwidth.

Embodiments consistent with the present invention might be implemented in hardware. Alternatively, or in addition, embodiments consistent with the present invention might be implemented as stored program instructions executed by a processor.

Figure 14:
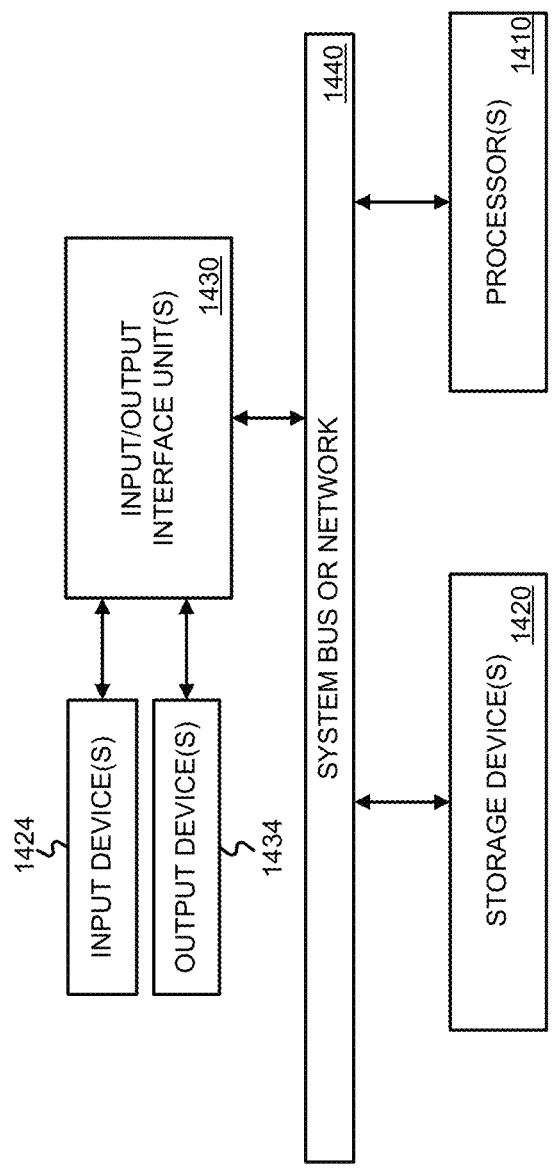
FIG. 14 is high-level block diagram of an exemplary machine 1400 that may be used to perform one or more of the methods described in this application, and/or store information used and/or generated by such methods.

FIG. 14 is high-level block diagram of an exemplary machine 1400 that may be used to perform one or more of the methods described in this application, and/or store information used and/or generated by such methods. For example, one or more machines 1400 may be provided as the various "units" used in the foregoing description. The exemplary machine 1400 includes one or more processors 1410, one or more storage devices 1420, one or more input/output interface units 1430, and one or more system buses and/or networks 1440 for facilitating the communication of information among the coupled elements. One or more input devices 1432 (e.g., video cameras, microphones, touch screens, keyboards, etc.) and one or more output devices 1434 (e.g., video displays, speakers, etc.) may be coupled with the one or more input/output interfaces 1430. The one or more processors 1410 may execute machine-executable instructions to effect one or more aspects of the present invention. At least a portion of the machine executable instructions may be stored (temporarily or more permanently) on the one or more storage devices 1420 and/or may be received from an external source via one or more input interface units 1430.

In some embodiments consistent with the present invention, the processors 1410 may be one or more microprocessors. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§4.8 CONCLUSIONS

As should be appreciated from the foregoing, the various example embodiments consistent with the present invention permit the determination of user perceived delays in audio and video conferencing systems and services.

What is claimed is:

1. A method for measuring a user perceived one-way delay in a video conferencing system, the method comprising:
  a) running a stopwatch program on a receiving unit at a first location to generate a source stopwatch video ("SV") displayed on a display device associated with the receiving unit;
  b) capturing, with a video camera associated with a sending unit at the first location, video of the displayed SV ("DSV");
  c) sending, via the video conferencing system, the captured DSV ("CDSV") from the sending unit to the receiving unit;
  d) receiving, by the receiving unit, the sent CDSV ("SCDSV");
  e) displaying, by the receiving unit, the received SCDSV ("RCDSV") on a display device associated with the receiving unit, thereby generating a display screen including both (1) a current stopwatch video, and (2) the RCDSV;
  e) capturing a snapshot of the display screen including both (1) an image of the current stopwatch video, and (2) an image of the RCDSV;
  f) converting, using a processor, (1) the image of the current stopwatch video in the captured snapshot to a first stopwatch value, and (2) the image of the RCDSV in the captured snapshot to a second stopwatch value; and
  g) determining the user perceived one-way delay in the video conferring service based on a time difference between the first stopwatch value and the second stopwatch value.

2. The method of claim 1, wherein the user perceived one-way delay includes time delays from each of video capture, video encoding, video transmission, video decoding and video rendering.

3. The method of claim 1, wherein the each of the units is one of (A) a personal computer, (B) a tablet, or (C) a smart phone.

4. The method of claim 1 wherein the stopwatch video includes at least two digits corresponding to a fraction of a second.

5. A method for measuring a user perceived delay in a video conferencing system, the method comprising:
  a) running a stopwatch program on a first unit at a first location to generate on a display device associated with the first unit, a source stopwatch video ("SV");
  b) capturing, with a video camera associated with the first unit, video of the displayed SV ("DSV");
  c) sending, via the video conferencing system, the captured DSV ("CDSV") from the first unit to a second unit at a second location remote from the first location;
  d) receiving, by the second unit, the sent CDSV ("SCDSV");
  e) displaying, on a display device associated with the second unit, the received SCDSV ("RCDSV");
  f) capturing, with a video camera associated with the second unit, video of the displayed RCDSV ("DRCDSV");
  g) sending, via the video conferencing system, the captured DRCDSV ("CDRCDSV") from the second unit back to the first unit;
  h) receiving, by the first unit, the sent CDRCDSV ("SCDRCDSV");
  i) displaying, by the first unit, the received SCDRCDSV ("RCDRCDSV") on the display device associated with the first unit, thereby generating a display screen including both (1) a current source stopwatch video, and (2) the RCDRCDSV;
  j) capturing a snapshot of the display screen including both (1) an image of a current source stopwatch video, and (2) an image of the RCDRCDSV;
  k) converting, using a processor, (1) the image of the current source stopwatch video in the captured snapshot to a first stopwatch value, and (2) the image of the RCDRCDSV in the captured snapshot a second stopwatch value; and
  l) determining a user perceived round-trip delay in the video conferring service based on a time difference between the first stopwatch value and the second stopwatch value.

6. The method of claim 5, wherein the user perceived round-trip delay includes time delays from each of video capture, video encoding, video transmission, video decoding and video rendering.

7. The method of claim 5, wherein the each of the units is one of (A) a personal computer, (B) a tablet, or (C) a smart phone.

8. The method of claim 5 further comprising:
  m) determining a user perceived one-way delay based on the determined user perceived round-trip delay.

9. The method of claim 5 wherein the stopwatch video includes at least two digits corresponding to a fraction of a second.

10. A method for measuring a user perceived one-way delay in a mobile video conferencing system, the method comprising:
  a) running a stopwatch program on a receiving unit at a first location;
  b) generating on a display device associated with the receiving unit, a source video ("SV") including both (1) a standard test video and (2) a source stopwatch video from the stopwatch program;
  c) capturing, with a video camera associated with a mobile sending unit at the first location, the displayed SV ("DSV");
  d) sending, via the video conferencing system, the captured DSV ("CDSV") from the mobile sending unit to the receiving unit;
  e) receiving, by the receiving unit, the sent CDSV ("SCDSV");
  f) displaying, by the receiving unit, the received SCDSV ("RCDSV") on the display device, thereby generating a display screen including both (1) a current source video, including both (i) a current standard test video and (ii) a current source stopwatch video, and (2) the RCDSV;

g) capturing a snapshot of the display screen including both (1) an image of the current source video, and (2) an image of the RCDSV;

h) converting, using a processor, (1) a portion of the image of the current source video in the captured snapshot to a first stopwatch value, and (2) a portion of the image of the RCDSV in the captured snapshot to a second stopwatch value; and i) determining the user perceived one-way delay in the mobile video conferring service based on a time difference between the first stopwatch value and the second stopwatch value.

11. The method of claim 10, wherein the user perceived one-way delay includes time delays from each of video capture, video encoding, video transmission, video decoding and video rendering.

12. The method of claim 10, wherein the each of the units is one of (A) a personal computer, (B) a tablet, or (C) a smart phone.

13. The method of claim 10 wherein the stopwatch video includes at least two digits corresponding to a fraction of a second.

14. A method for measuring a user perceived round-trip delay in a mobile video conferencing system, the method comprising:

a) running a stopwatch program on a stopwatch unit at a first location, to generate on a display device associated with the stopwatch unit, a display including a source stopwatch video ("SV") from the stopwatch program;

b) capturing, with a video camera associated with a mobile unit at the first location, video of the displayed SV ("DSV");

c) displaying, on a display device associated with the mobile unit, the captured DSV ("CDSV");

d) sending, via the video conferencing system, the CDSV from the mobile unit to a second unit;

e) receiving, by the second unit, the sent CDSV ("SCDSV");

f) displaying, by the second unit, the received SCDSV ("RCDSV");

g) capturing, by a video camera of the second unit, video of the displayed RCDSV ("DRCDSV");

h) sending, via the video conferencing system, the captured DRCDSV ("CDRCDSV") from the second unit to the mobile unit;

i) receiving, by the mobile unit, the sent CDRCDSV ("SCDRCDSV");

j) generating, by the mobile unit, a display screen including both (1) a current source stopwatch video, and (2) the received SCDRCDSV ("RCDRCDSV");

k) capturing a snapshot of the display screen of the mobile unit including both (1) an image of the current source stopwatch video, and (2) an image of the RCDRCDSV;

l) converting, using a processor, (1) a portion of the image of the current source stopwatch video to a first stopwatch value, and (2) a portion of the image of the RCDRCDSV to a second stopwatch value; and m) determining the user perceived round-trip delay in the mobile video conferencing service based on a time difference between the first stopwatch value and the second stopwatch value.

15. The method of claim 14, wherein the user perceived round-trip delay includes time delays from each of video capture, video encoding, video transmission, video decoding and video rendering.

16. The method of claim 14, wherein the each of the units is one of (A) a personal computer, (B) a tablet, or (C) a smart phone.

17. The method of claim 14 wherein the stopwatch video includes at least two digits corresponding to a fraction of a second.

* * * * *